United States Patent [19]

Kaplan et al.

[11] Patent Number: 4,797,913

[45] Date of Patent: Jan. 10, 1989

[54] DIRECT TELEPHONE DIAL ORDERING SERVICE

[75] Inventors: Murray Kaplan, Cherry Hill; Robert W. Humes, Moorestown, both of N.J.

[73] Assignee: Science Dynamics Corporation, Cherry Hill, N.J.

[21] Appl. No.: 81,670

[22] Filed: Aug. 4, 1987

[51] Int. Cl.⁴ .......................................... H04M 11/00
[52] U.S. Cl. ...................................... 379/91; 379/94; 379/201
[58] Field of Search ............................. 379/91–94, 379/97, 102, 104, 105, 201, 207; 358/84–86; 455/2, 4, 5

[56] References Cited

U.S. PATENT DOCUMENTS

| | | | |
|---|---|---|---|
| 3,920,908 | 11/1975 | Kraus | 379/91 |
| 4,165,446 | 9/1979 | Flowers et al. | 379/94 |
| 4,555,594 | 11/1985 | Friedes et al. | |
| 4,565,903 | 1/1986 | Riley | 379/201 X |

FOREIGN PATENT DOCUMENTS

| | | | |
|---|---|---|---|
| 217308 | 4/1987 | European Pat. Off. | 379/91 |
| 87/04884 | 8/1987 | PCT Int'l Appl. | 358/86 |

OTHER PUBLICATIONS

Yankee Group, Boston, MA, "Cable and the Telcos: From Confrontation to Détente", Report No. 83-1, Jun. 1983, pp. 162–167.

A. F. Bulfer, "Dial-A-View", Talk Given at the Motion Picture Industry Seminar, Dec. 3, 1984, Los Angeles, Calif.

Semir, Sirazi et al., "Comparative Study of Hybrid IPPV Implementations", Cable 85: Sessions in Detail, Session No. 13, Jun. 3, 1985, Las Vegas, Nev.

Andrew F. Bulfer et al., "A Trial of a National Pay-Per-View Ordering and Billing System", *NCTA Technical Papers*, 1986, pp. 134–138.

Science Dynamics, "Profit from Impulse-Pay-Per-View", Advertisement, *Telephony*, Jul. 14, 1986, p. 59.

*Primary Examiner*—Keith E. George
*Attorney, Agent, or Firm*—Charles F. Duffield

[57] ABSTRACT

A direct telephone dialing ordering system is disclosed wherein a calling customer can order products and/or services from a given vendor without voice interchange. The system operates in a Local Access and Transport Area (LATA) switching network which has Feature Group D services utilizing the 15 digit domestic dialing plan. The system is positioned within the LATA and is assigned a Feature Group D interexchange carrier number. An originating call utilizing the 15 digit domestic dialing plan of the Feature Group D service is directed to the system within the LATA to a point of termination as an interexchange carrier. The system is then free to utilize the remaining 10 digits of the originating call for determination of variables such as vendor, product, grade and the like designations. The Feature Group D Automatic Number Identification (ANI) for the calling customer is likewise passed on to the system for customer identification, credit verification and the like. The data is processed and batched and forwarded to a system ordering service vendor in visual printout or via data communication lines.

12 Claims, 2 Drawing Sheets

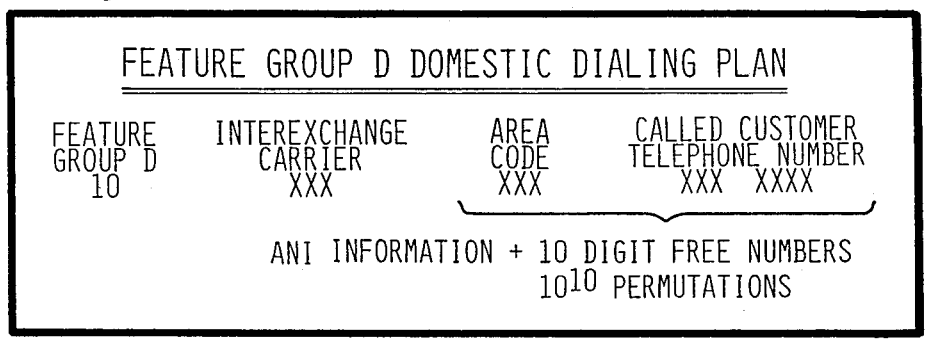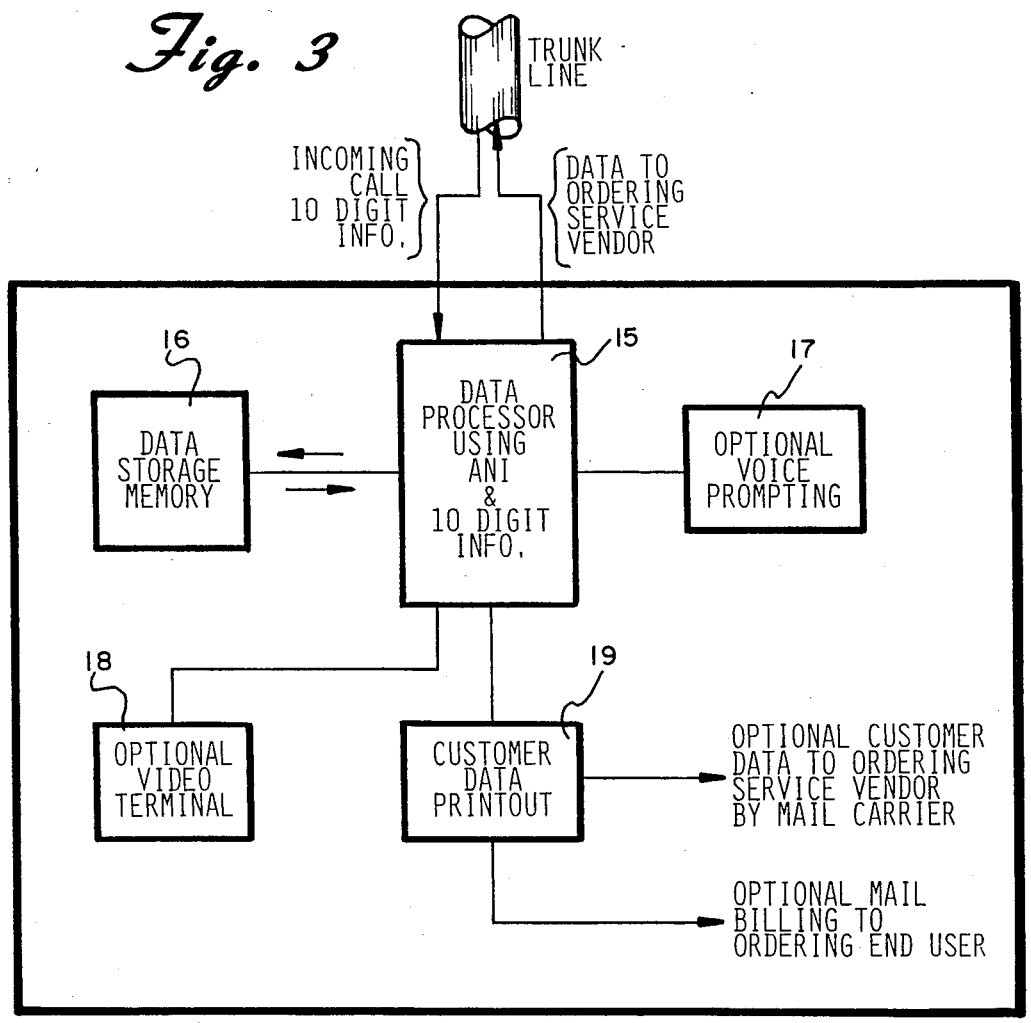

DIRECT TELEPHONE DIAL ORDERING SERVICE

BACKGROUND OF INVENTION

The present invention applies to the art of ordering of products and/or services at home from various vendors by means of telephone lines and, more specifically, to an automated ordering service conducted by means of telephone lines wherein no voice communication is required.

Telephone ordering services available today are the commonly known type wherein a customer can place a call to a remote vendor and order a given product by a product code. However, the call is received by the vendor through an operator and through voice communication the particulars of the product code, credit card identification, mailing address and the like are communicated. Such services are presently available for ordering of merchandise such as those normally found in department stores and, more recently, even in grocery stores.

The foregoing ordering systems include many drawbacks. One of the more obvious ones is that the particular vendors may have limited hours at which their operators are on standby to receive the orders. Additionally, at certain peak hours, the particular vendor may be tied up and the calling customer is unable to place an order. Additionally, there is the added expense on behalf of the vendor in the compensation necessarily paid to the operators who are taking the particular information.

With the advent of cable television and thus pay TV, there has been some variation in the process above-stated. In a pay TV system, the particular television station will have on file the particulars of a given subscriber, i.e. scope of the service desired, address and credit verification. In some of these pay TV systems, the telephone lines are used and a particular subscriber can call a specific number for the particular cable company involved and thus orally place an order with the company for the various programs that the subscriber desires to watch. Again, this system utilizing telephone lines encounters the typical problem of the subscriber calling on impulse shortly before the beginning of the program and thus most likely will encounter busy lines and thus be unable to watch the movie.

The assignee of the present patent application, Science Dynamics Corporation located at 1919 Springdale Road, Cherry Hill, N.J. has developed a system for pay TV which eliminates some of the problems encountered in the pay TV systems utilizing telephones as above-described. This system known as the Multi-Access Cable Billing System (MACBS) locates a system in the telephone company's central office. The cable TV company provides a listing of program and associated telephone numbers for the program either directly upon the TV screen or in a program listing. The customer makes a selection by calling one of the listed numbers using a push button or rotary dial telephone.

The call is routed to the MACBS through the telephone facilities via ANI sending type trunks. The MACBS stores the called and calling numbers and identifies the CATV company involved. The MACBS then transmits the selection and customer identification to the specified CATV company wherein the data is appropriately processed providing viewing of the selected program and ultimate customer billing. In this manner, the need for oral communication and operators at the cable TV company are eliminated along with its consequent delays.

While the above MACBS system does eliminate the need for voice communication and delays, the limitations are that for each given program to be viewed, i.e. an item, there must be an independent number to which the particular TV company must subscribe. This is a rather expensive and restricted situation.

SUMMARY OF INVENTION

The ordering system of the present invention permits end users or calling customers to place originating calls without voice communication and to place orders with an ordering service office wherein the number of vendors and product itentifications are almost unlimited while at the same time the ordering service office need only subscribe to sufficient incoming lines as are necessary to handle the total volume of calls. No need is required at the ordering service office for special dedicated lines on a number by number basis.

In accordance with the present invention, an ordering service office is placed within a given Local Access and Transport Area (LATA) switching network. The LATA provides Feature Group D service which provides for a 15 digit domestic dialing plan in which the first 5 digits designate the Feature Group D and an interexchange carrier and the remaining 10 digits in normal usage a 3 digit area code and 7 digit called customer number. The Feature Group D service within the LATA also provides for Automatic Number Identification (ANI) for the calling customer.

In accordance with the present invention, the ordering service office is assigned an interexchange carrier number and, in effect, becomes an interexchange carrier operating at a point of termination from a Feature Group D equipped end office or an access tandem.

An originating call utilizing the Feature Group D 15 digit numbering plan is automatically directed to the ordering service office as though it were an interexchange carrier. The ordering service office includes data processing equipment which will receive the call and then accept the remaining 10 digits for processing. Within these 10 digits, there can be the designation of a vendor and various product and/or service code designations. The 10 digits provide $10^9$ distinct codes (some codes are received by the telephone company) which, for all practical purposes, is essentially unlimited.

The ordering service office data processing equipment is also programmed to receive the ANI information. The data processing equipment may be programmed with prerecorded customer-subscriber credit information to either accept or reject the order or the information may be merely stored for future processing.

At predetermined times, the data processing equipment at the ordering service office will process the order and customer information, and batch the same by vendor. Thereafter, the batched information may be transmitted to the respective vendors either via telecommunication lines or by visual computer printout as desired. Additionally and if desired, optional billing may even be undertaken by the order service office upon a customer by customer basis or by the local telephone company.

After receipt of the first originating call number, the data processing equipment may, optionally, provide voice prompting to the calling customer acknowledging receipt of the order and also advising that if additional orders are to be placed, they can likewise be dialed utilizing the last 10 digit numbers.

Other objects and advantages of the ordering system of the present invention will become apparent from the detailed description thereof which follows.

DESCRIPTION OF DRAWINGS

FIG. 1 is a diagram of the Feature Group D domestic dialing plan and how it is transformed into use in accordance with the ordering system of the present invention;

FIG. 3 is a block diagram illustrating the ordering service office network within an ordering service office in accordance with the present invention.

DETAILED DESCRIPTION OF INVENTION

Figure 2:
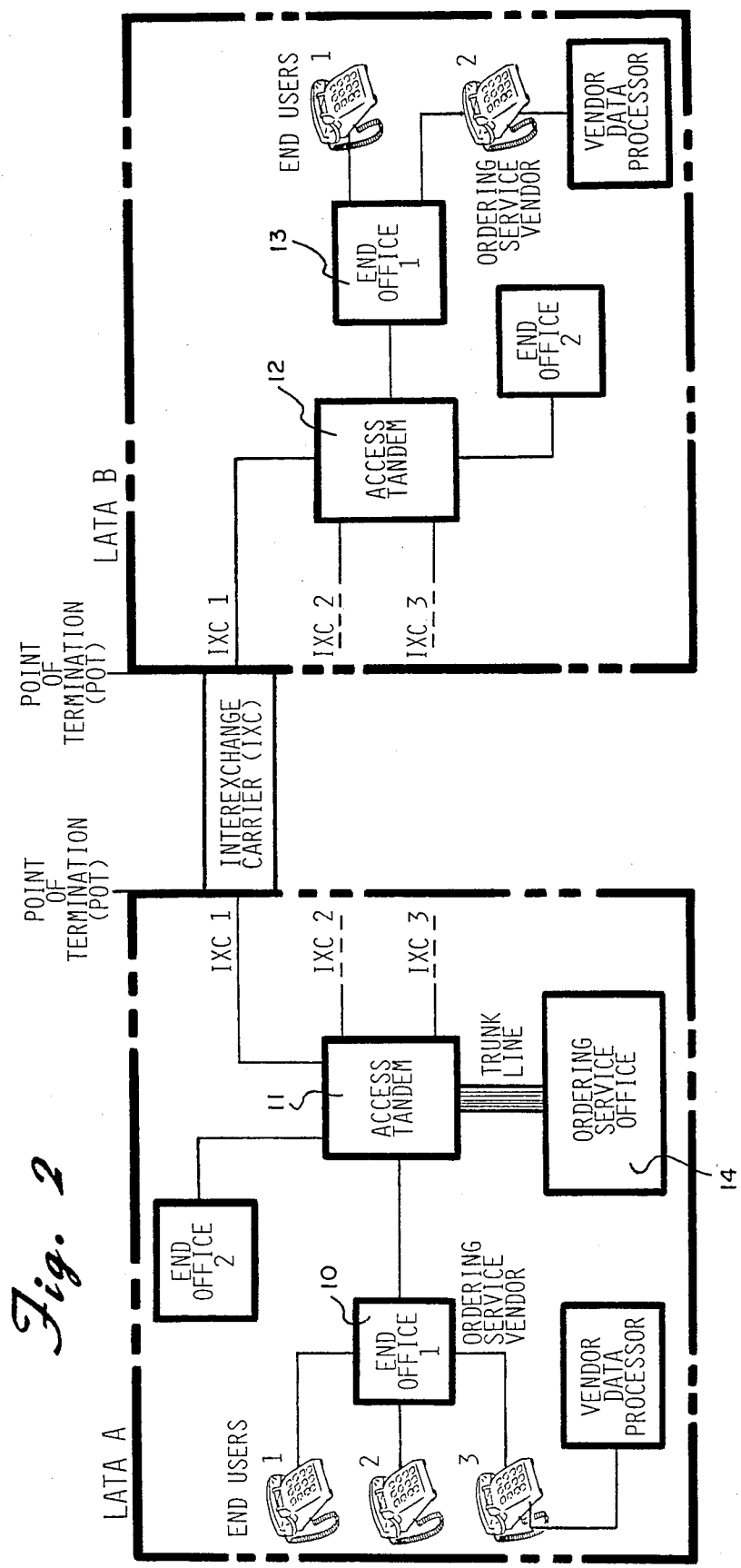
FIG. 2 is a block diagram illustrating the components of a LATA and the interconnection of one LATA to another in conjunction with the ordering system of the present invention.

With the advent of the break-up of AT&T, various independent telephone carriers emerged such as SPRINT, MCI and the like. These independent carriers, or interexchange carriers as they are known, carry telephone calls between the local operating companies. The local companies operate within what is known as a Local Access and Transport Area (LATA). The telephone calls carried by the interexchange carriers are transmitted to a point of termination at which they are picked up by the interexchange carrier and passed by that interexchange carrier on to a further LATA at a point of termination and thereupon again handled by the local operating company within that LATA for ultimate transmission to the end user's telephone.

The equal access concept created by the independent carriers gave rise to the necessity that the local operating companies provide certain information such as the identification of the particular calling customer. In response to this need, the telephone industry has developed what is known as the Feature Group D service. The Feature Group D service utilizes a Feature Group D domestic dialing plan and also an international dialing plan.

Referring to FIG. 1 of the drawings, there is illustrated the Feature Group D domestic dialing plan. The dialing plan utilizes 15 digits. The first two digits, which consist of a 1 and a 0, when dialed, bring into service the Feature Group D service. The next three digits designate an interexchange carrier, i.e. SPRINT, MCI or the like. The next three digits designate an area code. Lastly, the final seven digits designate the called customer's telephone number within the particular area.

Another feature of the Feature Group D service is the identification of the calling customer's telephone number. When the 15 digit number has been dialed and handed off to an interexchange carrier, the calling customer's telephone number can likewise be passed along to the interexchange carrier. This service is known as Automatic Number Identification or ANI.

Referring to FIG. 2, briefly in operation, an end user dials the 15 digits designating the Feature Group D service, his selected interexchange carrier, the area code of the called customer and the called customer's number. This number is passed through an end office 10 to an access tandem 11. The access tandem 11 then hands off the called number to the appropriate interexchange carrier at a point of termination and likewise the ANI information. The interexchange carrier then directs the telephone call to the appropriate area code wherein, at a point of termination, it is then handed off to an access tandem 12 within the appropriate LATA within that area code. Thereafter, the call is directed to the appropriate end office serving the particular end user who has been called. The interexchange carrier then via the ANI information can appropriately bill the calling customer. In some cases, appropriately equipped end offices can directly handle the Feature Group D service around the access tandem.

The automated ordering system of the present invention utilizes the Feature Group D services as though it were an interexchange carrier. In accordance with the present invention, and as shown in FIG. 2, an ordering service office 14 is established within a given LATA, i.e. LATA A. This particular ordering service office is assigned an interexchange carrier number and utilizes one or more trunk lines from an access tandem or appropriately equipped end office.

In accordance with the system, various vendors will subscribe to the ordering service. A given vendor will be assigned a vendor number. Additionally, for a given vendor, various numbers will be assigned to the various products being offered for sale by that particular vendor according to a planned numbering code.

In accordance with the system, the various subscribing vendors will then solicit ordering customers by any of various means, i.e. television advertising, direct mailing and the like. The subscribing vendors can then transmit product information to be sold to the various subscribing ordering customers likewise by various means, i.e. direct mailed catalogs. Such catalogs would include listings of products for sale together with an appropriate product code number.

The subscribing vendor, at the time of acquiring a subscribing customer, will obtain such information from that customer such as his address, telephone number and credit information. This particular information may be utilized directly by the subscribing vendor or, in the alternative and as hereinafter later described, passed on to the ordering service office.

By way of example, assume that the particular ordering service office is assigned interexchange carrier number 915. Next, assume that the ordering service office will not be handling any more than 100 ordering service vendors. Accordingly, assume that a given vendor, i.e. an appliance store, is assigned vendor number 25. Lastly, assume that a particular product, for example, a green two door 20 cubic foot Westinghouse refrigerator is assigned product code number 15743210. Under this scheme, the numbering plan can provide for 100 vendors and $10^7$ product permutations per vendor. The final resultant number to be placed in the particular vendor's product catalog would thus be 10 915 25 15743210.

In use, a particular subscribing ordering customer would review the product catalog and choose the product that the customer wants. Thereupon, the customer would dial directly the number, i.e. that set forth above, for the particular product associated with that number. Upon completion of the dialing, the called number would be directed through the end office and through the access tandem and retained within the LATA and directed via the trunk line to the ordering service office 14. The access tandem 11 would also pass the ANI information on to the ordering service office associated with the called number previously received.

Referring now to FIG. 3, there is illustrated in block diagram the functional components of an ordering service office network. The ordering service office network would include a data processor 15 and associated data storage memory 16. An optional voice prompting system 17 may likewise be provided as well as an optional video terminal 18. Likewise, a customer data printout system 19 may be utilized.

In operation, the data processor will receive and store the incoming call with its 10 digits of information as well as the ANI information. At this point, the data processor now has information identifying the vendor involved, the particular vendor's product and the telephone number of the ordering customer. At this time, an optional voice prompting device 17 may advise the customer that his order has been received and/or advise the customer that if additional merchandise is desired to be ordered, the final 10 digits for the product code can likewise be dialed in if the customer has a push tone phone. Optionally, the particular vendor involved can also provide subscribing customer telephone numbers and credit information which can be placed in the data storage memory 16. The data processor may likewise compare the ANI information to determine if the calling customer is in fact a subscribing customer and if the customer's credit is satisfactory. The voice prompting device 17 may thus acknowledge to the customer that the order has been received or has been rejected accordingly.

At predetermined intervals, i.e. on an hourly or daily basis, the data processor will process and batch the information received on a vendor by vendor basis. For a given vendor there will be the products ordered by product code number and the ANI information for the customer ordering the product. The data processor then can transmit such data to the subscribing or ordering service vendor via a telecommunications link consisting of the telephone system. As shown in FIG. 2, the data is passed through the access tandem and appropriate end office back to the ordering service vendor. Located at the ordering service vendor's facilities is an appropriate data processor which is programmed to receive the product code and ANI information and to convert the same into the identity of the product and the subscribing customer. Product delivery and billing by the vendor can then proceed in a normal course.

In many instances, the ordering service vendor may not be located within the same LATA as the ordering service office. In this case, the ordering service office positioned in the various LATAs around the country will simply transmit the processed data for that particular vendor through the ordinary telecommunications link utilizing a particular interexchange carrier as illustrated in FIG. 2.

As shown in FIG. 3, an alternative form of communication of the data for a given customer may be in the form of a visual printout utilizing the customer data printout facilities 19. In this case, the printed data may be simply mailed or otherwise delivered to a particular vendor. If a vendor desires, the ordering service office may be provided with not only the subscribing customer's telephone number but likewise their address and other product information such as the identity of the product associated with a given product code and its description. In these cases, the ordering service office may additionally provide the service of direct billing for the product to the ordering customer.

From the foregoing description of the ordering system of the present invention, it will be appreciated that the system utilizes the Feature Group D service within a given LATA to provide a 10 digit free numbering plan for vendor and product identification while likewise utilizing the associated ANI information for ordering customer identification. The system provides extreme flexibility and practically unlimited permutations in vendor and product code while only utilizing as many dedicated lines as required to handle the volume of incoming calls.

The ordering system of the present invention has been described in respect to the particular embodiment thereof described in the specification and as shown in the drawings. Other variations and modifications thereof may as a reason thereof become apparent to those skilled in the art and accordingly, the scope of the invention is not intended to be limited by the specific embodiment thereof described in the specification and shown in the drawings but is to be interpreted in accordance with the appended claims.

What is claimed is:

1. A system providing for automated ordering of products or services by a calling customer by direct telephone dialing and providing customer, vendor and product identification for use within a Local Access and Transport Area (LATA) switching network having Feature Group D service utilizing the 15 digit domestic dialing plan with Feature Group D and interexchange carrier designations in the first 5 digits and providing Automatic Number identifications (ANI) for the calling customer comprising:

data processing means within the LATA assigned an interexchange carrier number and interconnected to the LATA switching network to receive calls at a point of termination as an interexchange carrier based upon the first 5 digit designation and wherein the data processing means is programmed to receive and process the final 10 digits of the 15 digit call for determination of variables such as vendor, product, grade and the like designations; and wherein the data processing means is further programmed to receive and process the ANI information, 2. The system of claim 1 wherein the data processing means is further programmed to process and compile the 10 digit information per vendor and to periodically communicate such information to the vendor.

3. The system of claim 2 wherein the data processing means communicates the compiled data to the vendor by means of a telecommunications path.

4. The system of claim 2 wherein the data processing means communicates the compiled data to the vendor by means of a visual printout.

5. The system of claim 1 wherein the data processing means is programmed with calling customer credit information and the ANI information is compared with the credit information for credit verification.

6. The system of claim 1 wherein the data processing means further includes voice prompting means and is programmed upon the receipt of a first call to voice prompt the calling customer to enter further sequential final 10 digit calls for additional orders.

7. A method providing for automated ordering of products or services by a calling customer by direct telephone dialing to provide customer, vendor and product identification within a Local Access and Transport Area (LATA) switching network having Feature Group D service utilizing the 15 digit domestic dialing plan with Feature Group D and interexchange carrier designations in the first 5 digits and providing Automatic Number Identification (ANI) for the calling customer comprising the steps of:

assigning data processing means within the LATA, an interexchange carrier number and interconnecting the data processing means to the LATA switching network to receive calls at a point of termination as an interexchange carrier based upon the first 5 digit designation and programming the data processing means to receive and process the final 10 digits of the 15 digit call for determination of variables such as vendor, product, grade and the like designations; and programming the data processing means to receive and process the ANI information.

8. The method of claim 7 wherein the data processing means is further programmed to process and compile the 10 digit information per vendor and to periodically communicate such information to the vendor.

9. The method of claim 8 wherein the data processing means communicates the compiled data to the vendor by means of a telecommunications path.

10. The method of claim 8 wherein the data processing means communicates the compiled data to the vendor by means of a visual printout.

11. The method of claim 7 wherein the data processing means is programmed with calling customer credit information and the ANI information is compared with the creidt information for credit verification.

12. The method of claim 7 wherein the data processing means further includes voice prompting means and is programmed upon the receipt of a first call to voice prompt the calling customer to enter further sequential final 10 digit calls for additional orders.

* * * * *